United States Patent [19]

Okamura et al.

[11] Patent Number: 4,504,027
[45] Date of Patent: Mar. 12, 1985

[54] MAGNETIC TAPE CLAMPING DEVICE

[75] Inventors: Masatoshi Okamura; Haruo Shiba, both of Tokyo, Japan

[73] Assignee: TDK Corporation, Tokyo, Japan

[21] Appl. No.: 493,237

[22] Filed: May 10, 1983

[30] Foreign Application Priority Data

May 17, 1982 [JP] Japan .......................... 57-70629[U]

[51] Int. Cl.³ ............................................. B65H 75/28
[52] U.S. Cl. ................... 242/74.1; 242/199; 24/460; 24/473
[58] Field of Search ............... 24/460, 461, 462, 473, 24/543, 570, 563; 160/383, 391, 392, 395, 400; 242/74.1, 199; 360/134

[56] References Cited

U.S. PATENT DOCUMENTS

| 684,113 | 10/1901 | Shaddle | 160/392 |
| 1,424,209 | 8/1922 | Pabst | 24/460 |
| 1,468,624 | 9/1923 | Bennett | 24/460 |
| 3,195,828 | 7/1965 | Kuckhoff et al. | 242/74.1 |
| 3,863,857 | 2/1975 | Smith | 242/74.1 |
| 3,960,338 | 6/1976 | Shapley | 242/74.1 |
| 4,300,729 | 11/1981 | Oishi et al. | 242/74.1 |
| 4,341,358 | 7/1982 | Shoji | 242/74.1 |
| 4,360,173 | 11/1982 | Shoji | 242/199 |

FOREIGN PATENT DOCUMENTS

| 187877 | 12/1956 | Austria | 24/473 |
| 2559582 | 9/1977 | Fed. Rep. of Germany | 242/74.1 |
| 2817160 | 10/1979 | Fed. Rep. of Germany | 242/74.1 |

Primary Examiner—Victor N. Sakran
Attorney, Agent, or Firm—Oblon, Fisher, Spivak, McClelland & Maier

[57] ABSTRACT

A magnetic tape clamping device comprises an upper band portion, legs formed at both ends of the upper band portion and an elastically deformable lower band portion connecting the lower ends of the legs and being adapted to be fitted into a recess formed in a reel hub to clamp the end of a magnetic tape. The lower band portion of the magnetic tape clamping device is so formed that the thickness of both edge portions is smaller than that of the central portion.

4 Claims, 6 Drawing Figures

MAGNETIC TAPE CLAMPING DEVICE

The present invention relates to a magnetic tape clamping device for clamping an end of a magnetic recording tape or the other tape to a reel hub.

A magnetic tape clamping device has been widely used to clamp a magnetic recording tape, a leader tape, or a trailer tape etc. to a reel hub.

An example of the clamping device as shown in FIGS. 1 and 2. The clamping device (C) is formed of a plastic molding product having a relatively high rigidity and and comprises an upper band portion (1), a pair of legs (2), (3), a elastically deformable lower band portion (4) having a thickness smaller than that of the upper band portion to compensate insufficiency of elasticity of the legs, and each engaging projection (6) or (7), extending to the outside of the lower end of each leg (2) or (3), which is to be fitted to a recess formed in a reel hub (5). The configuration of the clamping device is such that it entirely fills a space of the recess formed in the reel hub (5) when the clamping device is fitted into the recess.

When clamping device is used, a magnetic tape T is inserted into the recess of the reel hub (5) as shown in FIG. 3 and the clamping device C is forcibly put in the recess by utilizing its elastic deformation, thus the end of the magnetic tape is clamped by or engaged with the recess of the reel hub (5) and the clamping device as shown in FIG. 1.

Although the conventional clamping device has an excellent tape retaining function, it has an disadvantage that a magnetic tape may be damaged if the clamping device is not adequately handled for fitting into the recess. More detailed explanation will be made in this respect. In case that the clamping device is put in the recess of the reel hub and if the posture of the clamping device is uneven in view of the width direction, that is, in the direction perpendicular to the surface of the paper with respect to FIGS. 1 and 3 and in the transverse direction with respect to FIG. 2, the clamping device is fitted into the recess in inclined state. Therefore, a strong force is applied to the magnetic tape at a portion near the front or rear edge of the clamping device. It has been found that a shearing force is locally applied to the magnetic tape when the clamping device is forced into the recess.

It is an object of the present invention to overcome the disadvantage of the conventional clamping device and to provide a clamping device which eliminates risk of damaging a magnetic tape by the edge of the clamping device when the clamping device is fitted into the recess of a reel hub.

The foregoing and the other objects of the present invention have been attained by providing a magnetic tape clamping device comprising an upper band portion, legs formed at both ends of the upper band portion and an elastically deformable lower band portion connecting the lower ends of the legs and being adapted to be fitted into the recess of a reel hub to clamp the end of a magnetic tape, wherein the lower band portion is so formed that the thickness of both edge portions is smaller than that of the central portion.

An embodiment of the present invention will be described with reference to FIGS. 4 to 6. The same reference numerals designate the same or corresponding parts of the clamping device shown in FIGS. 1 to 3.

The magnetic tape clamping device is prepared by molding a plastic material in one piece and comprises a relatively thick upper band portion (1) having an outer circular portion corresponding to the curvature of the outer surface of a reel hub, legs (2), (3) each extending from each end of the upper band portion, a lower band portion (4) having some elasticity for connecting both the ends of legs and engaging projections (6), (7) each projecting outward from the lower end of each of the legs to engage with respective parts of the recessed portion formed in the reel hub.

Figure 1:
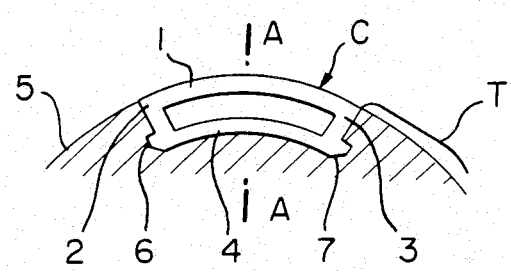
FIG. 1 is a front view, partly omitted, of the conventional magnetic tape clamping device.
Figure 2:
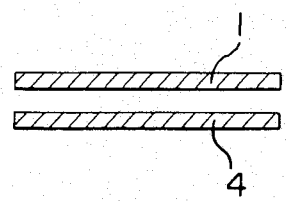
FIG. 2 is a cross-sectional view taken along line A—A of FIG. 1.
Figure 3:
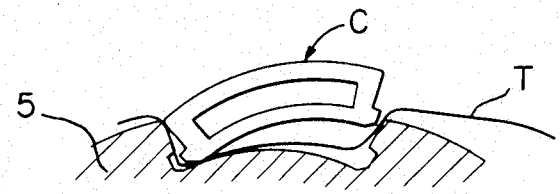
FIG. 3 is a schematic view showing how a magnetic tape clamping device is fitted into a recess of a reel hub.
Figure 4:
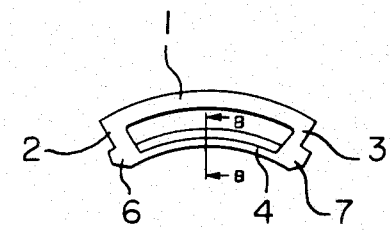
FIG. 4 is a front view of an embodiment of the clamping device of the present invention.
Figure 5:
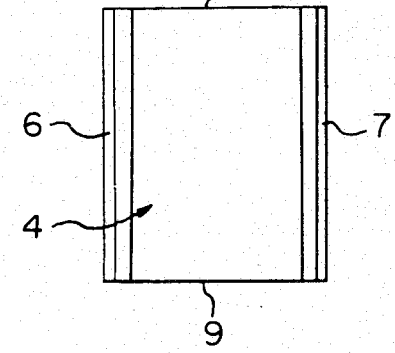
FIG. 5 is a bottom view of the clamping device of FIG. 5.
Figure 6:
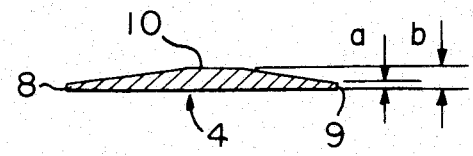
FIG. 6 is a cross-sectional view taken along line B—B of FIG. 4.

In accordance with the present invention, it is determined such that the thickness (a) of the lower band portion (4) is reduced toward both the edges (8), (9) in the width direction and the thickness (6) in the central portion (10) is relatively large. Preferably, the thickness of the lower band portion (4) is gradually reduced from the central portion (10) toward the edges (8), (9) as shown in FIG. 6. The thickness of the band portion (4) may be reduced linearly or with a curve. In the embodiment as shown in FIG. 6 the rate of the thickness of the central portion to the edge is $b \approx 2a$, however, it is possible to optionally select the values of (a) and (b) depending on the shape, dimension and material of the clamping device. The configuration in cross section as shown in FIG. 6 can be also modified depending on the conditions described above. Furthermore, insufficiently of elasticity resulted by reducing the thickness of both the edges can be compensated by forming the central portion thicker than the original central portion of the same material so that the magnetic tape clamping force of the clamping device is as a whole of the same level as the original clamping device.

In the embodiment, the lower band portion (4) has the uniform cross-sectional area in the longitudinal direction of the clamping device; however, it is possible that the cross-sectional area may be varied along the longitudinal direction.

In accordance with the magnetic tape clamping device of the present invention, even though the clamping device is fitted into a recess of a reel hub in an inclined posture, that is, either side of both edges is precedingly brought into contact with the reel hub, the magnetic tape is not injured because the thickness of the lower band portion at the contacting area is small to impart a sufficient resiliency. Furthermore, a sufficient tape-clamping force can be assured by selecting as desired the thickness of the central portion of the clamping device.

We claim:

1. A magnetic tape clamping device for reducing injury to magnetic tape clamped to a reel hub in the event of imperfect attachment of said clamping device to said reel hub, said device comprising:
   an upper band portion;

first and second legs formed at respective ends of said upper band portion;

an elastically deformable lower band portion connecting the lower ends of said legs, wherein said lower band portion comprises first and second edges and a central portion, each of said first and second edges extending longitudinally between said legs, and said central portion extending longitudinally between said legs; and means for reducing an excessive force applied to said tape in the event of imperfect attachment of said clamp to said reel hub, said means comprising thicknesses of said first and second edges that are both less than the thickness of said central portion, whereby said means reduce injury to said tape in the event of imperfect attachment of said clamping device to said reel hub.

2. A magnetic tape clamping device according to claim 1 wherein the thickness of said lower band portion is linearly decreased from the central portion to both the edge portions.

3. A magnetic tape clamping device according to claim 1 wherein the thickness of said lower band portion is decreased from the central portion to both the edge portions with a curved line.

4. A magnetic tape clamping device according to claim 1 wherein the central portion of said lower band portion is formed to have a relatively large thickness to compensate insufficient elasticity resulted by reducing the thickness of both the edge portions of said lower band portion.

* * * * *